(12) United States Patent
Wigmore et al.

(10) Patent No.: US 10,237,343 B1
(45) Date of Patent: Mar. 19, 2019

(54) SUSTAINING BACKUP SERVICE LEVEL OBJECTIVES USING DYNAMIC RESOURCE ALLOCATION

(71) Applicant: EMC Corporation, Hopkinton, MA (US)

(72) Inventors: Ian Wigmore, Westborough, MA (US); Stephen Smaldone, Woodstock, CT (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 453 days.

(21) Appl. No.: 14/961,764

(22) Filed: Dec. 7, 2015

(51) Int. Cl.
*H04L 29/08* (2006.01)

(52) U.S. Cl.
CPC ...... *H04L 67/1095* (2013.01); *H04L 67/1097* (2013.01); *H04L 67/16* (2013.01)

(58) Field of Classification Search
CPC .. H04L 67/1095; H04L 67/1097; H04L 67/16
See application file for complete search history.

(56) References Cited

U.S. PATENT DOCUMENTS

| | | | |
|---|---|---|---|
| 8,521,883 B1 * | 8/2013 | Wartnick | H04L 43/0888 709/226 |
| 9,235,579 B1 * | 1/2016 | Suarez | G06F 17/30073 |
| 2004/0267897 A1 * | 12/2004 | Hill | G06F 9/505 709/217 |
| 2013/0042004 A1 * | 2/2013 | Boss | G06F 9/5061 709/226 |
| 2013/0332505 A1 * | 12/2013 | Karandikar | H04L 67/1002 709/202 |
| 2015/0081912 A1 * | 3/2015 | Tan | H04L 67/1038 709/226 |
| 2015/0363275 A1 * | 12/2015 | Bernal | G06F 11/1461 707/654 |

OTHER PUBLICATIONS

Martin Raiber, Administration Manual for UrBackup Server 1.4.x, Aug. 22, 2015.*

* cited by examiner

*Primary Examiner* — Wing F Chan
*Assistant Examiner* — Billy H Ng
(74) *Attorney, Agent, or Firm* — Womble Bond Dickinson (US) LLP

(57) ABSTRACT

A backup engine of a first storage system receives a request to perform a backup session from the first storage system to a second storage system based on a backup service level objective (SLO) that has been configured for the backup session. In response to the request, it is determined that a first backup resource allocated for the backup session by the first storage system cannot satisfy the SLO based on statistics of prior backup sessions in view of characteristics of the backup session to be performed. A dynamic resource allocation (DRA) module is to dynamically perform a first DRA to modify the first backup resource to satisfy the SLO. The backup engine then initiates the backup session by transmitting backup data from the first storage system to the second storage system using the modified first backup resource.

19 Claims, 6 Drawing Sheets

SUSTAINING BACKUP SERVICE LEVEL OBJECTIVES USING DYNAMIC RESOURCE ALLOCATION

FIELD OF THE INVENTION

Embodiments of the present invention relate generally to data storage systems. More particularly, embodiments of the invention relate to sustaining backup service level objective (SLO) using dynamic resource allocation.

BACKGROUND

In information technology, a backup, or the process of backing up, refers to the copying and archiving of computer data so it may be used to restore the original after a data loss event. Backups have two distinct purposes. The primary purpose is to recover data after its loss, be it by data deletion or corruption. Data loss can be a common experience of computer users. The secondary purpose of backups is to recover data from an earlier time, according to a user-defined data retention policy, typically configured within a backup application for how long copies of data are required.

Since a backup system contains at least one copy of all data worth saving, the data storage requirements can be significant. Organizing this storage space and managing the backup process can be a complicated undertaking. Nowadays, there are many different types of data storage devices that are useful for making backups. There are also many different ways in which these devices can be arranged to provide geographic redundancy, data security, and portability. Many different techniques have been developed to optimize the backup procedure. These include optimizations for dealing with open files and live data sources as well as compression, encryption, and de-duplication, among others.

In some situations, the backups may be scheduled and processed according to a service level objective (SLO), also referred to as a service level agreement (SLA), with a particular entity associated with the backup data. An SLO may specify that a particular backup session must be completed within a predetermined time period or backup window. Similarly, the processing resources for handling a backup session may also be specified in the SLO or allocated prior to starting the backup session. However, due to a variety of factors, such as internal operations of a primary storage system (also referred to as a source storage system) and/or a protection storage (also referred to as a target, backup, or secondary storage system), or network congestion, there is a risk that the pre-allocated backup resources may not be sufficient to complete the backup session within the specified time period. Particularly, during a backup session between the primary and protection storage systems, conventional approaches do not have a capability of dynamically adjusting backup resources to ensure the backup session is be completed within the specified time period.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
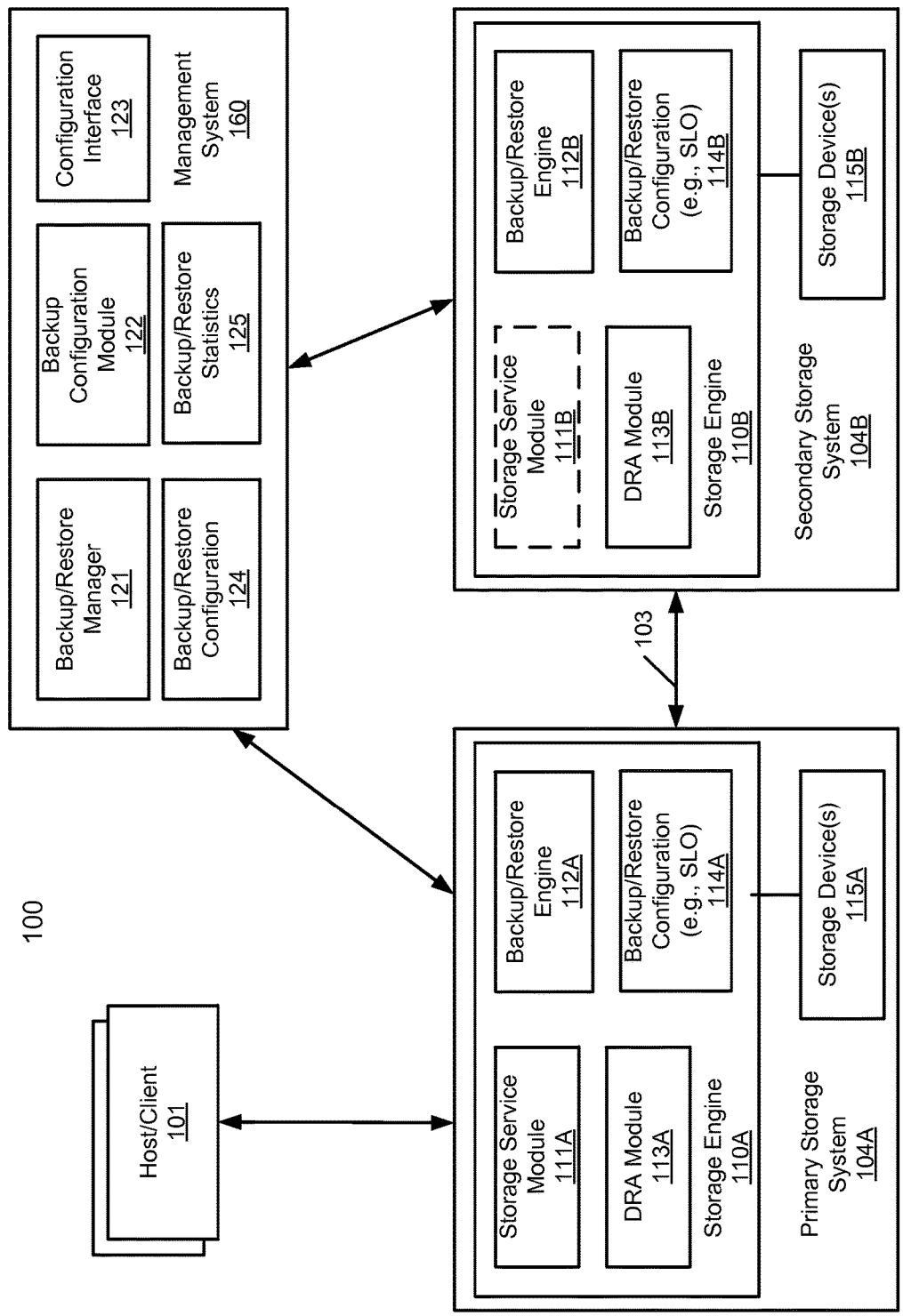
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, embodiments of primary and protection storage integration allow better handling of backup SLOs. In one embodiment, a dynamic resource allocation methodology for backup is implemented on both a primary storage system and a protection storage system. The primary storage system and the secondary storage system collaborate with each other to guarantee successful protection or backup session within a predetermined period of time (e.g., backup window). Both primary and protection storage systems are configured to be aware of a duration of a backup window, start time, and frequency, which may be specified in a corresponding SLO. In one embodiment, the primary storage system includes a dynamic resource allocation (DRA) logic, also referred to as a primary DRA, to dynamically estimate a new backup duration (e.g., changed capacity/throughput) based on a backup size in view of prior backup statistics.

If the estimated duration exceeds the backup window previously scheduled, according to one embodiment, the primary DRA may inform the protection storage system about a potential need for modifying backup resources in order to meet the backup window specified in the SLO. The primary DRA may perform certain pre-processing such as pre-moving the backup data to a higher performance device (e.g., a faster disk technology) prior to starting the backup session. Both primary DRA and protection DRA may modify (e.g., assigning more) processing resources (e.g., CPU cores) to the data transfer session for a higher bandwidth. Both primary DRA and protection DRA may allocate additional processors or processor cores and/or memory as needed. The primary DRA and/or protection DRA may dynamically enable or allocate additional input and output (IO) paths between primary and protection storage systems. The primary and protection DRAs may further change their respective SLO appropriately to have a successful backup session. The primary and protection DRAs may perform such optimizations during the backup session.

In one embodiment, a backup engine of a first storage system (e.g., primary or source storage) receives a request to perform a backup session from the first storage system to a second storage system (e.g., a protection, backup, or secondary storage) based on a backup service level objective (SLO) that has been configured for the backup session. In response to the request, it is determined that a first backup resource allocated for the backup session by the first storage system cannot satisfy the SLO based on statistics of prior backup sessions in view of characteristics of the backup session to be performed. A dynamic resource allocation (DRA) module is to dynamically perform a first DRA operation to modify the first backup resource to satisfy the SLO. The first storage system may inform the secondary storage system regarding the potential issue of not meeting the backup requirement of the backup SLO, which may allow the secondary storage system to adjust its backup resources accordingly. The backup engine then initiates the backup session by transmitting backup data from the first storage system to the second storage system using the modified first backup resource.

FIG. 1 is a block diagram illustrating a storage system according to one embodiment of the invention. Referring to FIG. 1, system 100 includes, but is not limited to, one or more client systems 101 communicatively coupled to storage systems 104A-104B (collectively referred to as storage systems 104) over a network. The network may be any type of networks such as a local area network (LAN), a wide area network (WAN) such as the Internet, a fiber network, a storage network, or a combination thereof, wired or wireless. Clients 101 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Storage system 104A may be a primary storage system (e.g., local data center) that provides storage to other local clients. Storage system 104A may periodically back up the content stored therein to storage system 104B operating as a backup storage system over connection 103. Connection 103 may be interconnect, a bus, a network connection (e.g., storage network), or a combination thereof.

Storage systems 104A-104B may have a similar or the same architecture or configuration. In one embodiment, storage system 104A is a primary storage system to provide storage services to clients 101, while storage system 104B is a secondary storage system to provide protection (e.g., backup services) to storage system 104A and/or other primary storage systems. Storage systems 104A-104B may be implemented within an electronic rack. Alternatively, storage systems 104A-104B may be implemented in separate electronic racks or different locations. For the purpose of illustration, details of storage system 104A will be described below. However, the same or similar description may also be applied to storage system 104B using similar or counterpart reference numbers. For example, a description of component 111A may also be applicable to counterpart component 111B, or vice versa.

Storage system 104A may include or represent any type of servers or a cluster of one or more servers (e.g., cloud servers). For example, storage system 104A may be a storage server used for various different purposes, such as to provide multiple users or client systems with access to shared data and/or to back up (or restore) data (e.g., mission critical data). Storage system 104A may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104A may further provide storage services via an object-based protocol and Hadoop distributed file system (HDFS) protocol.

In one embodiment, storage system 104A includes, but is not limited to, storage engine 110A and one or more storage units or devices 115A. Storage engine 110A includes storage service module 111A, which may represent any storage service related components configured or adapted to provide storage services (e.g., storage as a service, file system read or write) to a variety of clients using any of the access protocols set forth above. Storage engine 110A further includes backup and restore engine 112A (also referred to as backup/restore engine or simply backup engine) configured to back up data from storage devices 115A to secondary storage system 104B to be stored in storage devices 115B. Backup/restore engine 112A is configured to retrieve and restore backup data from backup storage 104B and back to client 101.

Storage devices 115A may be implemented locally (e.g., single node operating environment) or remotely (e.g., multi-node operating environment). Storage devices 115A may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system.

In one embodiment, storage system 104A further includes a storage manager or storage controller (not shown) configured to manage storage resources of storage system 104A, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

In one embodiment, management system 160 hosts backup/restore manager 121, backup configuration module 122, configuration interface 123, backup/restore configuration 124, and backup/restore statistics 125. Configuration interface 123 may be Web interface, an application programming interface (API), or a command line interface (CLI) to allow an administrator to access (e.g., login) management system 160. After being successfully authenticated and authorized, an administrator can configure via backup configuration module 122 a set of backup and/or restoration policies for a particular entity as a tenant (e.g., one of enterprise entities or corporations in a multi-tenant system). A backup/restore policy is referred to herein as an SLO and stored as part of backup/restore configuration 124. A backup SLO may then be pushed to or downloaded by backup manager 121 to the associated source storage system and target storage system, in this example, source storage system 104A as part of backup/restore configuration 114A and target storage system 104B as part of backup/restore configuration 114B. Backup manager 121 may further maintain backup/restore statistics 125 of prior backup/restore sessions performed by all of the storage systems managed by management system 160, in this example, storage systems 104A-104B. The backup/restore statistics may be periodically received from storage systems 104A-104B directly or via a third-party data collector.

As described above, backup configuration 114A may specify which of data set (e.g., database, file, directory) stored in storage devices 115A to be backed up, the size of the backup data, a period of time within which the corresponding backup session should be completed, and the frequency of the backup (e.g., how often a backup session should be performed), etc. Backup configuration 114A may further specify a set of backup resources (e.g., processor, memory) to be allocated for the backup session. Based on backup configuration or SLO 114A, backup engine 112A is configured to allocate a set of backup resources and schedule a backup window for the backup session to back up data to storage system 104B. Similar or the same information of backup configuration 114A may be pushed or downloaded from management system 160 to storage system 104B as a target storage system and stored as part of backup configuration 114B. Based on backup configuration or SLO 114B, backup engine 112B is configured to allocate a set of backup resources and schedule the corresponding counterpart of the backup session to receive backup data from storage system 104A.

In one embodiment, DRA modules 113A-113B collaborate together to guarantee a successful backup session within a predetermined period of time set forth in SLOs 114A-114B. Both backup engines 112A-112B are aware of a duration of a backup window, start time, and frequency, which may be specified in SLOs 114A-114B. In one embodiment, DRA module 113A is to dynamically estimate a new backup duration (e.g., changed capacity or throughput) based on prior backup statistics, which may be received from management system 160 as part of backup/restore statistics 125.

If the estimated duration exceeds the backup window previously scheduled based on SLO 114A, according to one embodiment, primary DRA module 113A may inform secondary DRA module 113B about a potential need for modifying backup resources in order to meet the backup window specified in SLOs 114A-114B. DRA 113A may perform certain pre-processing such as pre-moving the backup data to a higher performance device (e.g., a faster disk technology) prior to starting the backup session. Both primary DRA 113A and secondary DRA 113B may modify (e.g., assigning more) processing resources (e.g., CPU cores) to the data transfer session for a higher bandwidth. Both primary DRA 113A and secondary DRA 113B may allocate additional internal memory space as needed. The primary DRA 113A and/or secondary DRA 113B may dynamically enable or allocate additional input and output (IO) paths between primary and secondary storage systems 104A and 104B. The primary and secondary DRAs 113A-113B may further change their respective SLO appropriately to have a successful backup session. The primary and secondary DRAs 113A-113B may perform such optimizations prior to starting and/or during the backup session.

Figure 2:
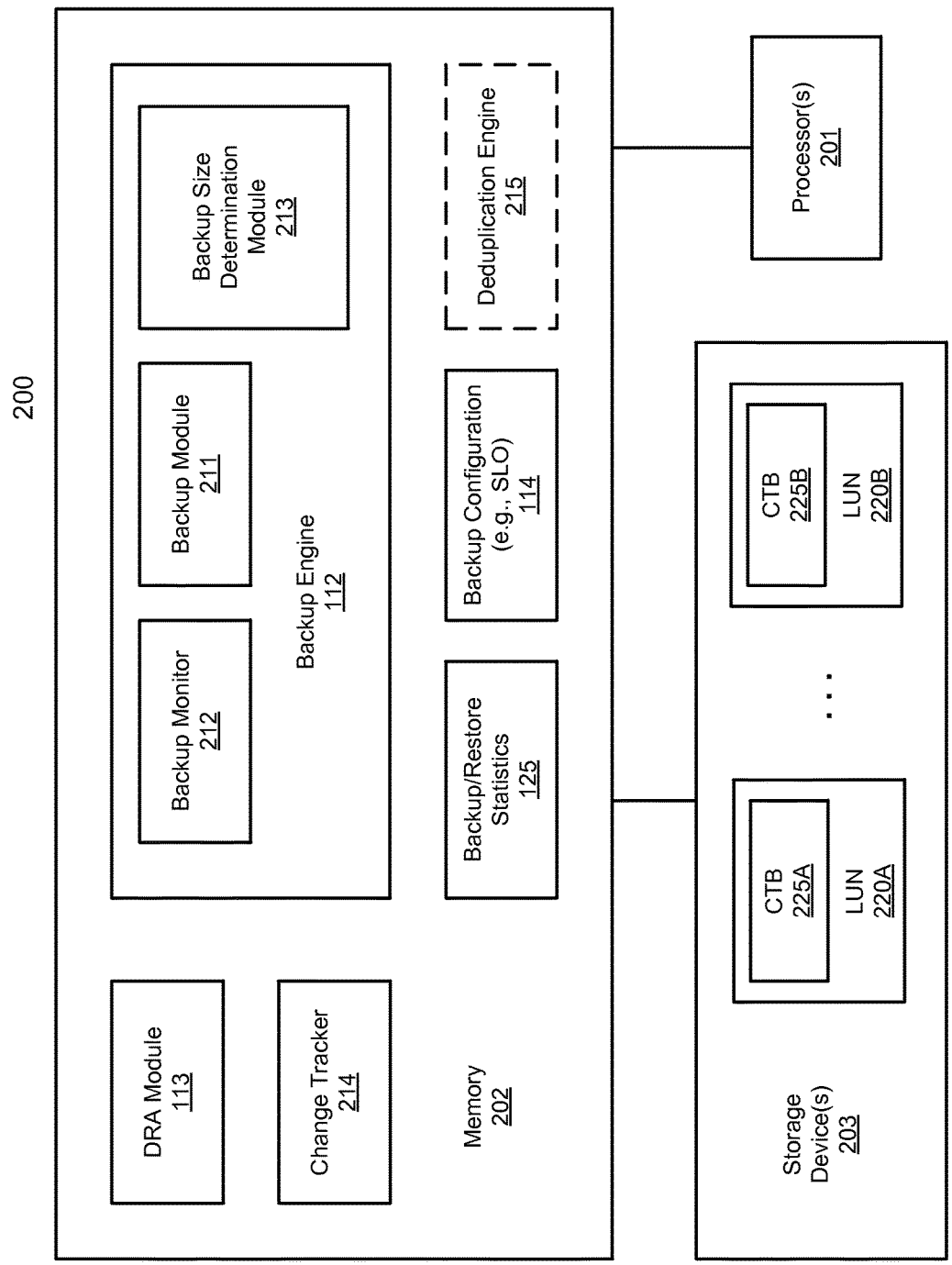
FIG. 2 is a block diagram illustrating a storage system according to one embodiment of the invention.

FIG. 2 is a block diagram illustrating a storage system according to one embodiment of the invention. System 200 may represent any one of storage systems 104A-104B of FIG. 1. For the purpose of illustration, system 200 will be described as a primary storage system to back up data to a secondary storage system. However, system 200 can also be configured as a secondary or backup storage system to back up data from a primary storage system. Referring to FIG. 2, system 200 includes backup engine 112, DRA module 113, change tracker 214, and optional deduplication engine 215 hosted in memory 202 and executed by one or more processors 201. System 200 may further include backup statistics 125 and backup SLO 114, which may be downloaded from a management server (e.g., management system 160) and optionally stored in one or more persistent storage devices 203. System 200, operating as a primary storage system, may be configured to store data from a variety of client devices (e.g., clients 101). The data may be further segmented and deduplicated by deduplication engine 215 into deduplicated data chunks or data segments. The deduplicated data chunks or segments are then stored in storage devices 203 in one or more logical units (LUNs) 220A-220B representing various storage volumes. Memory 202 may be any kind of volatile memory devices such as random access memory (RAM) devices. Persistent storage devices 203 may be any kind of non-volatile memory devices.

In one embodiment, backup module 211 is configured to schedule a backup session based on backup SLO 114 to back up data specified by backup SLO 114 to a backup storage system operating as a secondary storage system. Backup SLO 114 may be downloaded or received from a centralized management system, where backup SLO 114 may be configured via a configuration interface by an administrator of an entity associated with data maintained by system 200. Backup SLO 114 may include information specifying the starting time of a backup session, a duration or backup window of the backup session within which the backup session has to be completed, a selected set of data (e.g., particular file(s) or database(s)) to be backed up, and/or backup frequency (e.g., how often the backup session should be performed), etc.

In one embodiment, backup monitor 212 is configured to monitor the operations of backup sessions performed by system 200 and may compile backup statistics of some or all of the backup sessions performed by system 200. Backup monitor 212 may maintain a backup event log to record certain backup events during the backup sessions including, but are not limited to, starting time, backup duration, backup size, and any other events occurred during the backup sessions. Backup monitor 212 may periodically transmit the recorded information to a centralized management system or server (e.g., management system 160) to be stored, incorporated with prior statistics, and further analyzed, for example, as part of statistics 125.

In one embodiment, change tracker 214 is configured to track or record a number of tracks or pages of data that have been changed since the last backup session. In this example, data stored in LUNs 220A-220B of storage devices 203 may be in a form of tracks or data pages, where each track or page has a certain fixed size dependent upon the storage configuration of storage system 200. For example, a track or data page may include 128 kilobytes (KB) of data. Data is also accessed in an access unit of track or page by the file system (not shown). In general, a next backup session would only need to back up the changed data since the unchanged data has already been backed up to a backup storage system last time, which is also referred to as an incremental backup.

In one embodiment, change tracker 214 maintains a changed track bitmap (CTB), such as CTBs 225A-225B LUNs 220A-220B, respectively. CTBs 225A-225B may be stored in a corresponding LUN or alternatively, CTBs 225A-225B may be stored in a centralized storage location or storage region of storage devices 203. Each of CTBs 225A-225B includes an array of bits, each bit corresponding to one of the data tracks or data pages stored in a corresponding LUN. In this example, CTB 225A includes bits corresponding to the tracks or pages stored in LUN 220A, while CTB 225B includes bits corresponding to tracks or pages stored in LUN 220B. A bit of a CTB having a predetermined logical value (e.g., logical TRUE or FALSE) may indicate that a corresponding track or page has been changed since the last backup session. Change tracker 214 may be communicatively coupled to a file system or storage controller that when a client writes (e.g., modify, erase) to a particular track or page, change tracker 214 may be notified and set a corresponding bit in a corresponding CTB, for example, as shown in FIG. 4.

Figure 4:
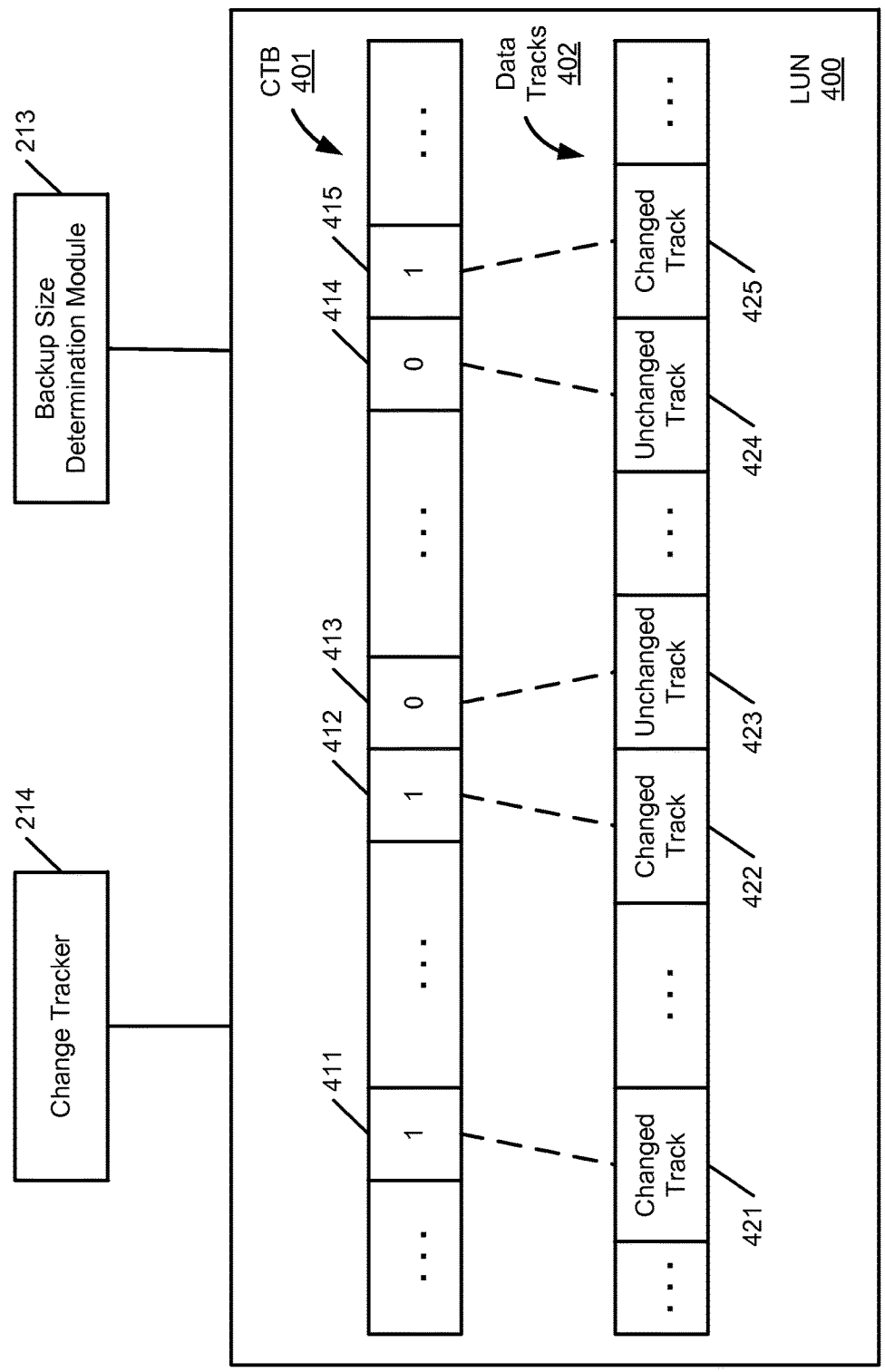
FIG. 4 is a block diagram illustrating mapping of a changed track bitmap and changed tracks according to one embodiment of the invention.

Referring now to FIG. 4, in this example, LUN 400 includes data tracks or pages 402 received from clients and stored therein. LUN 400 is also associated with CTB 401 having information indicating which of the data tracks or pages 402 have been modified since the last backup session. LUN 400 may represent any of LUNs 220A-220B and CTB 401 may represent any of CTBs 225A-225B of FIG. 2. CTB 401 may be set or configured by change tracker 214 based on the actions performed by the storage system in response to requests from the clients. In one embodiment, CTB 401 includes multiple bits, each bit corresponding to one of the data tracks 402. A bit having a predetermined logical value indicates that a corresponding data track has been modified since the last backup session. In this example, bits 411-415 correspond to data tracks 421-425, respectively.

When a client writes to one of the data tracks 402, change tracker 214 sets a corresponding bit of CTB 401 to a predetermined logical value. For example, when a client writes to track 421, change tracker 214 sets bit 411 to logical value TRUE to indicate that track 421 has been modified since last backup session. In this example, bits 411-412 and 415 have been set to logical value TRUE and thus tracks 421-422 and 425 have been changed since last backup session, while tracks 423-424 are unchanged. Therefore, in a subsequent backup session, only the changed tracks 421-422 and 425 need to be backed up to a backup storage system.

When the starting time of a backup session is approaching, backup size determination module 213 is invoked to walk through CTB 401 to determine the number of bits having a predetermined logical value and to determine the backup size based on the number of bits with the predetermined logical value and a unit size of a data track or page. Prior to counting the number of bits in CTB 401, a snapshot may be captured and the backup size may then be determined based on the snapshot. The live data that modifies CTB 401 and data tracks 402 after the snapshot may be considered as part of next backup session.

Referring back to FIG. 2, in one embodiment, in response to a request for a new backup session that has been scheduled based on backup SLO 114, backup module 211 invokes backup size determination module 213 to determine a backup size representing an amount of backup data to be backed up for the new backup session based on a number of changed tracks determined by change tracker 214. In one embodiment, backup size determination module 213 is configured to count (e.g., via change tracker 214) a number of bits in CTBs 225A-225B that have a predetermined logical value to determine a number of changed tracks or pages. The backup size can then be determined by multiplying the number of changed tracks with the size of each track.

Given the determined backup size for the new backup session, according to one embodiment, DRA module 113 is configured to determine whether the backup resources specified in or pre-allocated based on backup SLO 114 are sufficient to complete the backup session within the goal (e.g., to be completed within a backup window) specified in backup SLO 114 in view of prior backup statistics 125. The determination may be performed further based on the current operating environment or conditions, such as, for example, network or connection congestion between the primary and secondary storage systems, internal resource demands or availability of the primary and secondary storage systems, etc. The DRA modules of the primary and secondary storage systems may communicate with each other to determine the required backup resources and to coordinate with each other prior to and during the backup session.

In one embodiment, the backup size is determined around the starting time that has been scheduled for the backup session to improve the accuracy of the determination. Typically, backup SLO 114 would specify which of data sets (e.g., by naming specific database, files, directories) are to be backed up. However, at the time of scheduling the backup session, it would not be feasible to determine which of the tracks or pages of the selected data set(s) are changed tracks. The tracks may be changed from time to time up until the starting time of the backup session, upon which a snapshot may be taken and the changed tracks are then determined from the snapshot. Thus, by employing backup size determination module 213 and change trackers 214, the backup size of an upcoming backup session can be more accurately determined.

According to one embodiment, if it is determined that the predetermined or preallocated backup resources are insufficient to perform the scheduled backup session based on backup SLO 114, DRA module 113 may inform a DRA counterpart module of the secondary storage system to allow the secondary storage system to perform appropriate DRA actions. The DRA operations performed by the secondary storage system may be similar to those performed at the primary storage system as described further below. DRA module 113 may perform certain DRA operations prior to and/or during the backup session to ensure that the backup session can be successfully completed within the specification set forth in backup SLO 114. In one embodiment, prior to starting or initiating the backup session, backup module 211 may move or relocate at least some of the backup data from a slower storage technology to a faster storage technology (e.g., solid state storage device). As a result, the backup data can be retrieved from the faster storage device and transmitted from the primary storage system to the secondary storage system during the backup session at a higher speed. Alternatively, DRA module 113 may modify backup SLO 114 to require or specify more backup resources, such that at the time of initiating the backup session, more resources can be allocated for the backup session.

In addition, according to one embodiment, prior to and/or during a backup session, DRA module 113 may allocate more processing resources of the storage system to the backup session, such as, for example, processors or processor cores, memory, cache, IO bandwidth (e.g., IO paths or lanes), etc. For example, DRA nodule 113 may reduce the processing resources utilized for providing storage services to clients and reallocate them to the backup session. For example, if the current resource configuration has allocated 4 IO paths to service the clients and 2 IO paths to be used for the backup session, DRA module 113 may deallocate 2 IO paths from servicing the clients and reallocate them to the backup session, such that there will be 2 IO paths used to service the clients and 4 IO paths used for the backup session. Furthermore, according to one embodiment, prior to and/or during the backup session, DRA module 113 may allocate additional connection paths or channels (e.g., Fibre channel paths) between the primary storage system and the secondary storage systems.

Note that a DRA module of the secondary storage module may perform some or all of the DRA operations described above, for example, in response to a notification received from the primary storage system and/or from a management system. Also note that during the backup session, backup monitor 212 periodically or constantly monitors the performance of the primary storage. Similarly, a counterpart backup monitor of the secondary storage system may also monitor the performance of the secondary storage system. These DRA module counterparts may further communicate with each other during the backup session to perform additional DRA operations set forth above.

In one embodiment, storage system 200 may be a deduplicated storage system, in which deduplication engine or logic 215 is configured to segment and deduplicate the data received from clients and store the data in storage devices 203 as deduplicated data segments or data chunks. In response to a data file to be stored in storage devices 203, according to one embodiment, deduplication logic 215 is configured to segment the data file into multiple segments (also referred to as chunks) according to a variety of segmentation policies or rules. Deduplication logic 215 may choose not to store a segment in a storage unit if the segment has been previously stored in the storage unit. In the event that deduplication logic 215 chooses not to store the segment in the storage unit, it stores metadata enabling the reconstruction of the file using the previously stored segment. As a result, segments of data files are stored in a deduplicated manner in storage devices 203 to reduce the storage space required to store the files. The metadata may be stored in at least some of storage devices 203. The metadata includes enough information to provide access to the files it contains.

Figure 3:
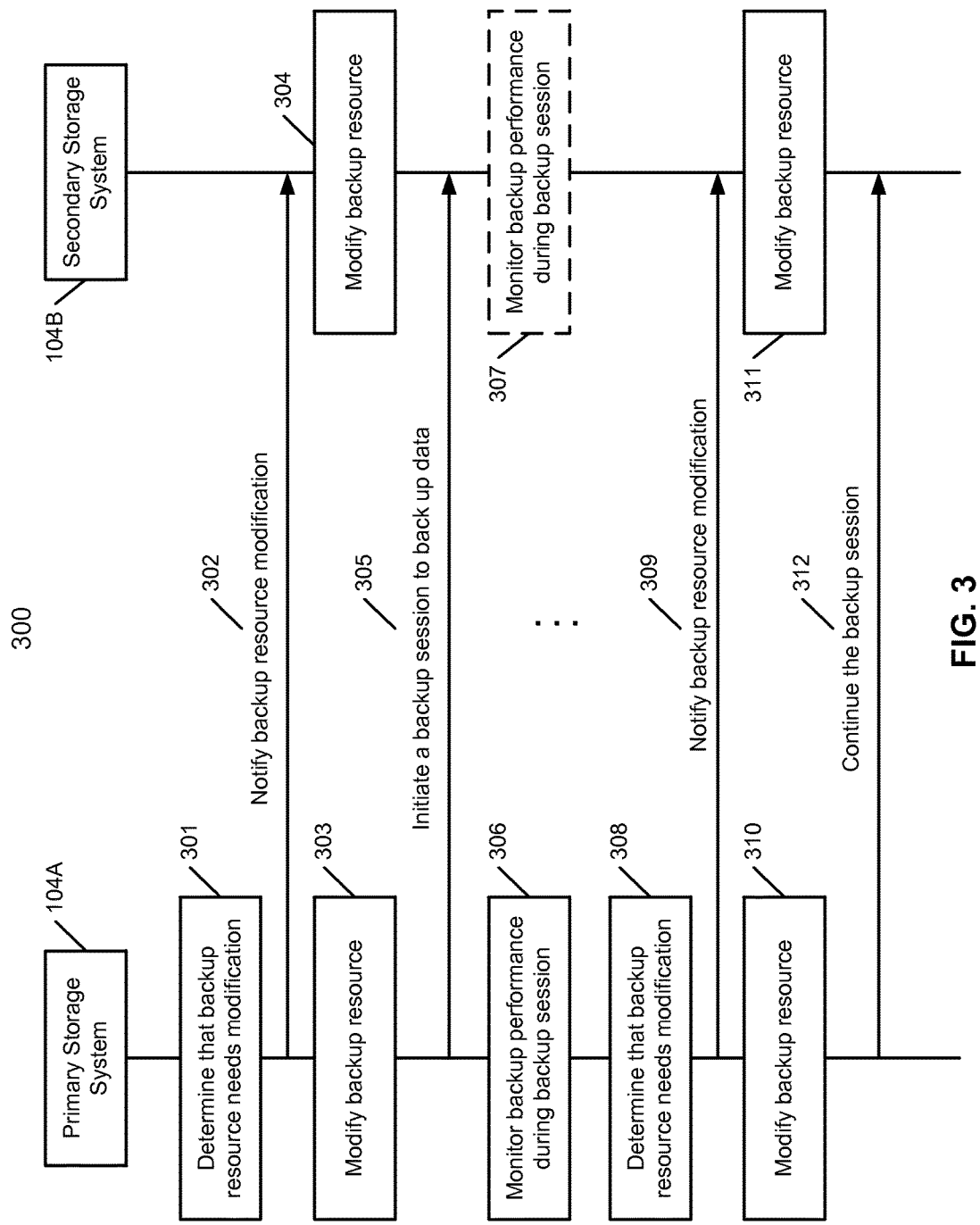
FIG. 3 is a processing flow illustrating interactions between a primary storage system and a secondary storage system according to one embodiment of the invention.

FIG. 3 is a processing flow illustrating interactions between a primary storage system and a secondary storage system according to one embodiment of the invention. Process 300 may be performed by system 100 of FIG. 1. Referring to FIG. 3, at transaction 301, primary storage system 104A determines that the backup resources currently allocated for a backup session need to be modified, for example, based on a backup size determined at the point in time in view of a corresponding backup SLO and prior backup history as described above. At transaction 302, primary storage system 104A transmits a notification to secondary storage system 104B to indicate that the backup session needs to be sped up. At block 303, primary storage system 104A performs DRA operations to modify the backup resources as described above. At block 304, secondary storage system 104B may also perform certain DRA operations. The backup session then starts at transaction 305.

During the backup session, at block 306, primary storage system 104A may periodically or constantly monitor the performance of the backup session. Similarly at block 307, secondary storage system 104B may also optionally monitor the performance of the backup session. If it is determined at block 308 that a further adjustment of backup resources is needed, primary storage system 104A may send another notification to secondary storage system 104B via transaction 309. Both primary and second storage systems 104A-104B may perform further DRA operations at blocks 310-311, respectively, and the backup session continues with the further adjusted backup resources via transaction 312.

Figure 5:
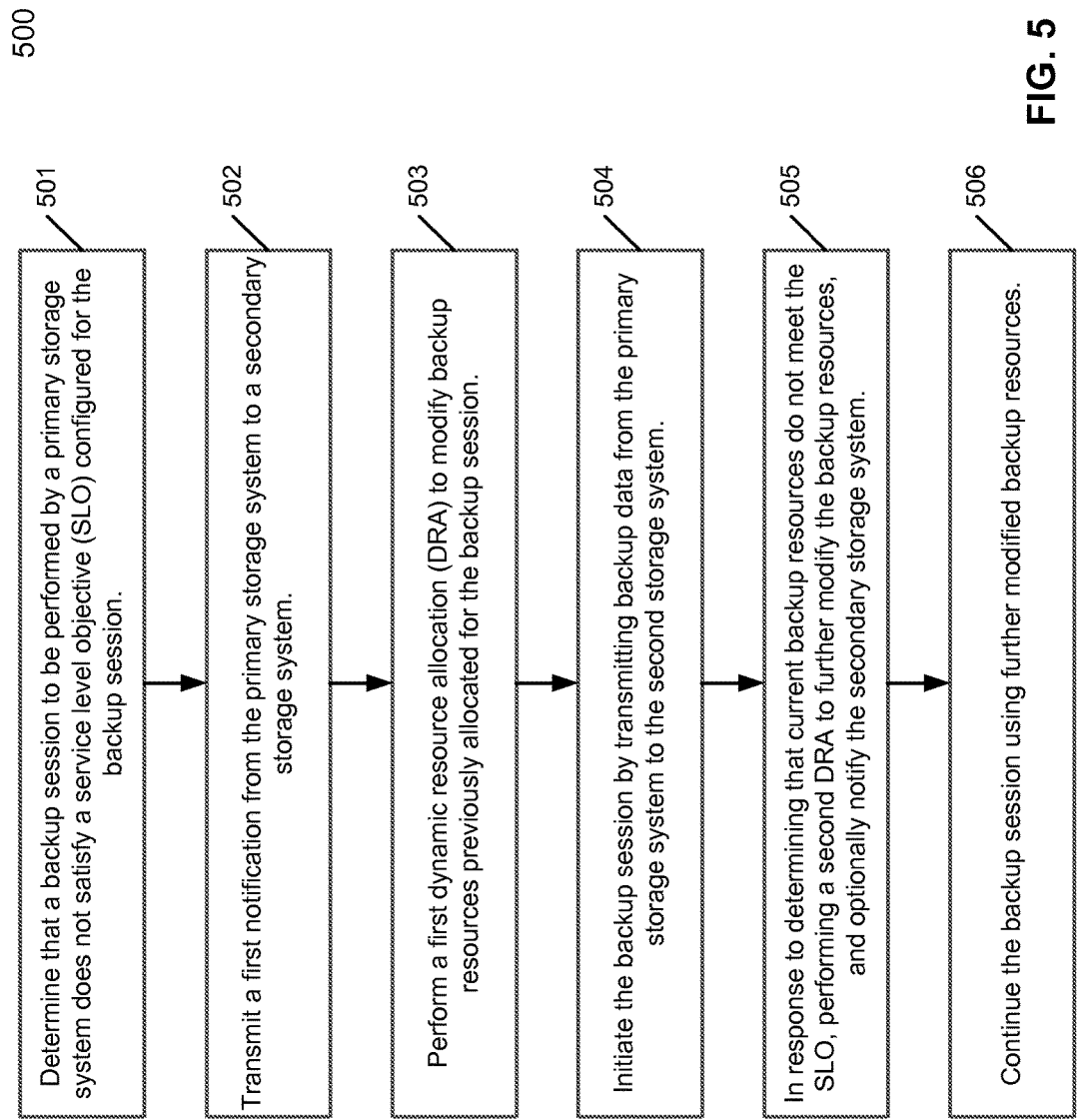
FIG. 5 is a flow diagram illustrating a process of performing a backup session according to one embodiment of the invention.

FIG. 5 is a flow diagram illustrating a process of performing a backup session according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by a primary storage system as described above. Referring to FIG. 5, at block 501, processing logic determines that a backup session to be performed at a primary storage system does not satisfy a backup SLO configured for the backup session. In one embodiment, when it is about to initiate a backup session, processing logic determines a backup size at the point in time, for example, by counting a number of data pages or tracks that have been modified since the last backup session. Given the backup size of an upcoming backup session and the backup resources and requirements specified in the backup SLO, the processing logic may determine that the backup session may not be completed within a specified period of time (e.g., backup window) specified in the backup SLO based on the backup resources specified in the backup SLO.

At block 502, processing logic transmits a signal or notification from the primary storage system to a second storage system indicating that the backup session needs to be adjusted in order to meet the requirement of the backup SLO. The notification allows the secondary storage system to perform certain DRA operations. At block 503, processing logic performs a first DRA operation to modify the backup resources previously allocated for the backup session, such as, for example, allocating additional processors or processor cores, memory, cache, IO resources, etc. At block 504, processing logic initiates or starts the backup session with the updated backup resources that are modified by the first DRA operation. The processing logic may continue monitoring the performance during the backup session. Subsequently during the backup session, at block 505, in response to determining that the current backup session no longer satisfies the backup SLO, processing logic performs a second DRA operation to further modify the backup resources to improve the performance of the backup session in an attempt to meet the requirement of the backup SLO. The processing logic may optionally notify the secondary storage system to allow the secondary storage system to perform a further DRA operation. Thereafter at block 506, processing logic continue performing the backup session using the further adjusted backup resources.

Figure 6:
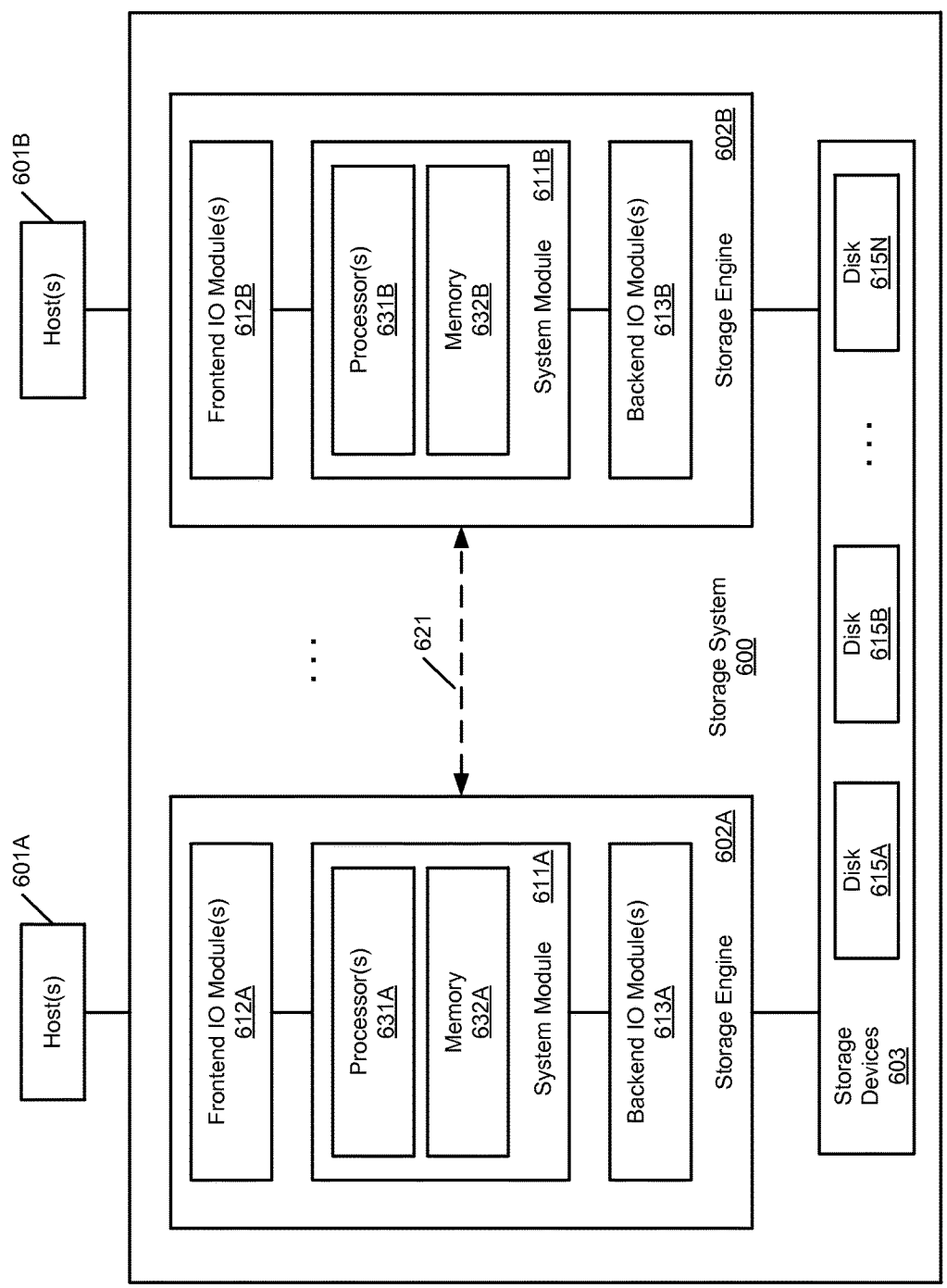
FIG. 6 is a block diagram illustrating a storage system according to one embodiment of the invention.

FIG. 6 is a block diagram illustrating a storage system according to one embodiment of the invention. System 600 may represent a primary storage system (e.g., primary storage system 104A), a secondary storage system (e.g., secondary storage system 104B), or a combination of thereof. Referring to FIG. 6, storage system 600 includes an array of storage engines 602A-602B collectively providing storage services to hosts 601A-601B for accessing data stored in storage devices 603. Each of storage engines 602A-602B may be physically or logically configured to have a set of processing resources (e.g., processor/processor core, memory, cache, IO bandwidth).

In one embodiment, each of storage engines 602A-602B includes one or more frontend IO modules (e.g., frontend IO modules 612A-612B) coupled to one or more of hosts 601A-601B, for example, via Fibre Channel, Internet small computer system interface (iSCSI), or gigabit Ethernet (GigE). Each storage engine further includes one or more backend IO modules (e.g., backend modules 613A-613B coupled to one or more of disks 615A-615N of storage devices 603. Each storage engine further includes a system module (e.g., system modules 611A-611B), each having a set of one or more processors or processor cores (e.g., processor(s) 631A-631B), memory (e.g., memories 632A-632B), and cache memory (not shown). Storage engines 602A-602B may communicate with each other via connection 621, which may be an interconnect, a bus, or a network connection.

Disks 615A-615N, also collectively referred to as disks 615A-615N, may be configured to operate as a part of a redundant array of independent disk (RAID). Data may be stored in one or more LUNs partitioned from the underlying physical storage of disks 615. Certain portions of the LUNs or underlying physical storage space may be partitioned and allocated to any one of storage engines 602A-602B. Similarly, processors 631A-631B and memories 632A-632B may be partitioned and allocated to any one of storage engines 602A-602B. In one embodiment, each of storage engines 602A-602B may include multiple directors. Each director includes a set of frontend IO modules, system module, and backend IO modules. Each of storage engines 602A-602B may be implemented as a part of system 200 as shown in FIG. 2 and perform some or all of the operations described above. Alternatively, each of the directors in a storage engine may represent system 200 of FIG. 2 and perform some or all of the operations described above.

In one embodiment, any one of storage engines 602A-602B and their associated ones of storage devices 603 may be configured to operate as a primary storage system to provide storage services to hosts 601A-601B and to back up data stored storage devices 603 to a secondary storage system as described above. Alternatively, any one of storage engines 602A-602B and their associated storage devices 603 may be configured to operate as a secondary storage system to receive backup data from a primary storage system as described above. Further, one of storage engines 602A-602B may be configured as primary storage systems, while another one of storage engines 602A-602B may be configured as secondary storage systems. For example, storage engine 602A (and its associated or allocated one or more of disks 615A-615N) may be configured to operate as a primary storage system. Storage engine 602B (and its associated or allocated one or more of disks 615A-615N) may be configured to operate as a secondary storage system to back up data from the primary storage system represented by storage engine 602A. Note that storage engines 602A-602B may be implemented within the same system bay of an electronic rack, while disks 615 may be implemented as a storage bay of the electronic rack.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for performing a backup session, the method comprising:
   receiving, by a backup engine of a first storage system, a request to perform a backup session from the first storage system to a second storage system based on a backup service level objective (SLO) that has been configured for the backup session, wherein the backup SLO includes information specifying that the backup session has to be performed within a predetermined period of time;
   in response to the request, determining, prior to performing the backup session, that a first backup resource allocated for the backup session by the first storage system cannot satisfy the SLO based on statistics of prior backup sessions in view of characteristics of the backup session to be performed, wherein determining that a first backup resource allocated for the backup session by the first storage system cannot satisfy the SLO comprises: determining a backup size of the backup session by calculating a number of data pages that have been changed since a last backup session from the first storage system to the second storage system; and determining that the backup session cannot be completed within the predetermined period of time based on the backup size in view of the statistics of the prior backup sessions;
   dynamically performing, by a dynamic resource allocation (DRA) module hosted by the first storage system, a first DRA to modify the first backup resource to satisfy the SLO; and
   initiating the backup session by transmitting backup data from the first storage system to the second storage system using the modified first backup resource.

2. The method of claim 1, further comprising transmitting a notification from the first storage system to the second storage system to cause the second storage system to modify a second backup resource allocated for the backup session by the second storage system.

3. The method of claim 1, further comprising:
   monitoring performance of the backup session in view of the SLO;
   determining during the backup session that the backup session still does not satisfy the SLO using the modified first backup resource; and
   dynamically performing a second DRA to further modify the modified first backup resource.

4. The method of claim 3, further comprising transmitting a notification from the first storage system to the second storage system to allow the second storage system to further modify the second backup resource, in response to determining that the backup session still does not satisfy the SLO.

5. The method of claim 1, wherein performing a first DRA comprises allocating more processor and memory resources to be exclusively utilized by the backup session.

6. The method of claim 5, further comprising:
   allocating one or more additional input and output (IO) paths between the first storage system and the second storage system; and
   deallocating one or more existing IO paths from a host device that has been allocated to the host device for accessing data stored in the first storage system.

7. The method of claim 5, further comprising, prior to initiating the backup session, moving at least a portion of the backup data from a first storage device to a second storage device within the first storage system, wherein the second storage device has a higher speed than the first storage device.

8. The method of claim 1, wherein performing a first DRA comprises modifying the SLO to be in alignment with the modified first backup resource for subsequent backup sessions.

9. A non-transitory machine-readable medium having instructions stored therein, which when executed by a processor, cause the processor perform operations performing a backup session, the operations comprising:
   receiving, by a backup engine of a first storage system, a request to perform a backup session from the first storage system to a second storage system based on a backup service level objective (SLO) that has been configured for the backup session, wherein the backup SLO includes information specifying that the backup session has to be performed within a predetermined period of time;
   in response to the request, determining, prior to performing the backup session, that a first backup resource allocated for the backup session by the first storage system cannot satisfy the SLO based on statistics of prior backup sessions in view of characteristics of the backup session to be performed, wherein determining that a first backup resource allocated for the backup session by the first storage system cannot satisfy the SLO comprises: determining a backup size of the backup session by calculating a number of data pages that have been changed since a last backup session from the first storage system to the second storage system; and determining that the backup session cannot be completed within the predetermined period of time based on the backup size in view of the statistics of the prior backup sessions;
   dynamically performing, by a dynamic resource allocation (DRA) module hosted by the first storage system, a first DRA to modify the first backup resource to satisfy the SLO; and
   initiating the backup session by transmitting backup data from the first storage system to the second storage system using the modified first backup resource.

10. The non-transitory machine-readable medium of claim 9, wherein the operations further comprise transmitting a notification from the first storage system to the second storage system to cause the second storage system to modify a second backup resource allocated for the backup session by the second storage system.

11. The non-transitory machine-readable medium of claim 9, wherein the operations further comprise:
   monitoring performance of the backup session in view of the SLO;
   determining during the backup session that the backup session still does not satisfy the SLO using the modified first backup resource; and
   dynamically performing a second DRA to further modify the modified first backup resource.

12. The non-transitory machine-readable medium of claim 11, wherein the operations further comprise transmitting a notification from the first storage system to the second storage system to allow the second storage system to further modify the second backup resource, in response to determining that the backup session still does not satisfy the SLO.

13. The non-transitory machine-readable medium of claim 9, wherein performing a first DRA comprises allocating more processor and memory resources to be exclusively utilized by the backup session.

14. The non-transitory machine-readable medium of claim 13, wherein the operations further comprise:
  allocating one or more additional input and output (IO) paths between the first storage system and the second storage system; and
  deallocating one or more existing IO paths from a host device that has been allocated to the host device for accessing data stored in the first storage system.

15. The non-transitory machine-readable medium of claim 13, wherein the operations further comprise, prior to initiating the backup session, moving at least a portion of the backup data from a first storage device to a second storage device within the first storage system, wherein the second storage device has a higher speed than the first storage device.

16. The non-transitory machine-readable medium of claim 9, wherein performing a first DRA comprises modifying the SLO to be in alignment with the modified first backup resource for subsequent backup sessions.

17. A data processing system operating as a first storage system, comprising:
  a processor;
  a memory coupled to the processor;
  a backup engine coupled to the memory and the processor to
    receive a request to perform a backup session from the first storage system to a second storage system based on a backup service level objective (SLO) that has been configured for the backup session, wherein the backup SLO includes information specifying that the backup session has to be performed within a predetermined period of time,
    in response to the request, determine, prior to performing the backup session, that a first backup resource allocated for the backup session by the first storage system cannot satisfy the SLO based on statistics of prior backup sessions in view of characteristics of the backup session to be performed, wherein determining that a first backup resource allocated for the backup session by the first storage system cannot satisfy the SLO comprises: determining a backup size of the backup session by calculating a number of data pages that have been changed since a last backup session from the first storage system to the second storage system; and determining that the backup session cannot be completed within the predetermined period of time based on the backup size in view of the statistics of the prior backup sessions; and
  a dynamic resource allocation (DRA) module to dynamically perform a first DRA to modify the first backup resource to satisfy the SLO, wherein the backup engine is to initiate the backup session by transmitting backup data from the first storage system to the second storage system using the modified first backup resource.

18. The system of claim 17, wherein the DRA module transmits a notification from the first storage system to the second storage system to cause the second storage system to modify a second backup resource allocated for the backup session by the second storage system.

19. The system of claim 17, further comprising a backup monitor configured to:
  monitor performance of the backup session in view of the SLO; and
  determine during the backup session that the backup session still does not satisfy the SLO using the modified first backup resource, wherein the DRA module is to dynamically perform a second DRA to further modify the modified first backup resource.

* * * * *